Patented Nov. 5, 1940

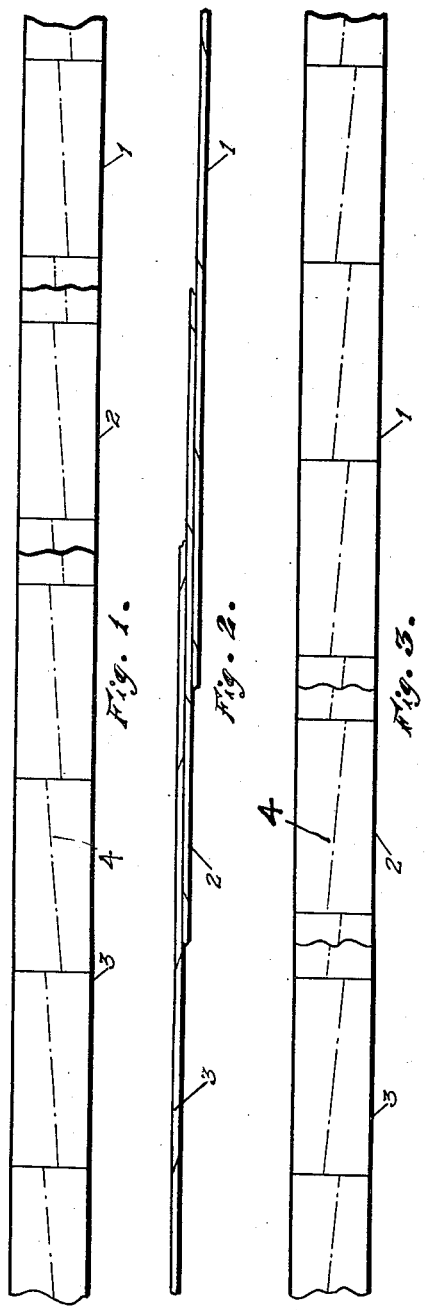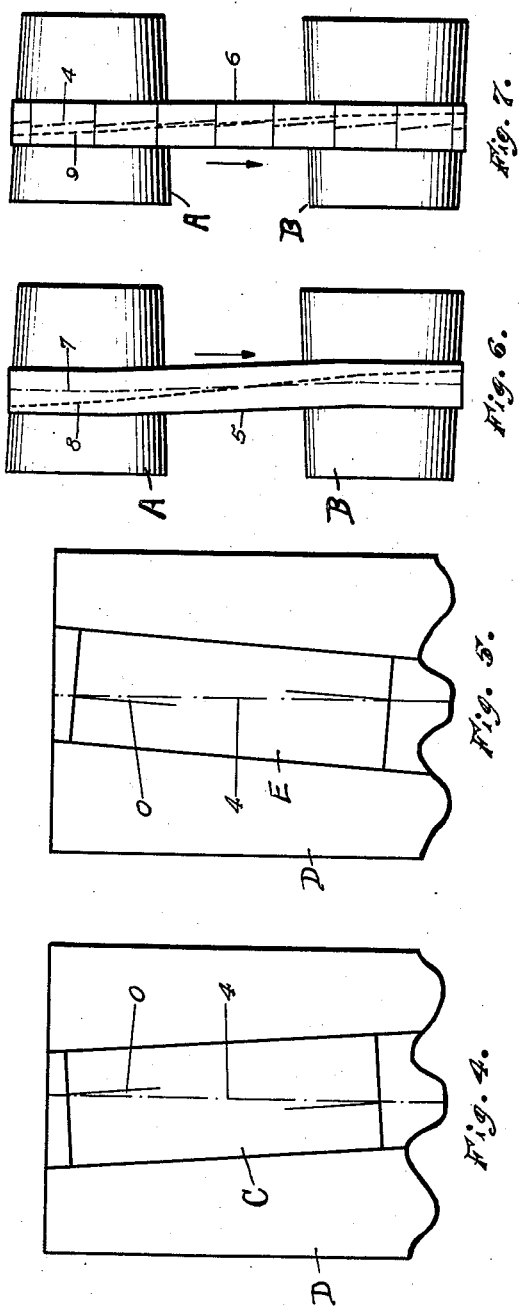

2,220,266

UNITED STATES PATENT OFFICE 2,220,266

BELT

Gustav A. Nelson, Mobile, Ala.

Application December 18, 1939, Serial No. 309,749

2 Claims. (Cl. 74—232)

My invention relates to the construction of leather belts for transmitting power from one cone pulley to another, and its object is to provide a belt which shall have maximum capacity and length of operative life.

I attain this object by the belt construction illustrated in the accompanying drawing, in which—

Figure 1 is a top plan, Figure 2 is an edge view and Figure 3 is a bottom plan of this improved belt under construction. Figures 4 and 5 show the method of cutting hides to obtain the plies necessary to build the present belt. Figure 6 shows the line of stress in an ordinary belt running on cone pulleys, and Figure 7 shows the lines of stress in a belt embodying the present invention.

Similar reference characters refer to similar parts throughout the several views.

In this specification the term "backbone of the hides" denotes those portions of the hides which extended along the back-bones or central portions of the hides of the animals from which the leather was obtained, such back or central portions being heavier, stronger and less extensible under stress than portions apart from the central line, and therefore capable of transmitting more power.

Cone pulleys, usually on parallel shafts, and tapering in opposite directions, are largely used in driving machines whose speed must be varied at times while the speed of the prime mover remains constant. The transmission of power from one pulley to the other is hard on a belt of ordinary construction because the linear speed of the belt when in a desired driving position on the pulleys is uniform across its surface while the ring speeds of the pulleys vary across the faces of the pulleys. This means that only one narrow circumferential band on each pulley has rim speed equal to the speed of the belt and this narrow contact band is at the edge of the belt where it contacts the part of the pulley of larger diameter, the belt being free from the pulleys for the greater part of its width.

In a drive embodying cone pulleys with the larger end of one pulley opposite the smaller end of the other, the stress or pull line of the belt will be from one edge where it contacts the larger part of the driving pulley, diagonally across the face of the belt to the opposite edge where it contacts the larger part of the driven pulley. This is indicated in Figure 6 where the belt 5 extends around the driving pulley A and driven pulley B, the line of stress 8 extending from one edge of the belt to the other, the line 7 along the middle of the belt serving to indicate the angle of the stress line.

In high-grade belts made to transmit power from one straight pulley to another, the backbone of the hides from which the belt is built is often located along the line 7 of Fig. 6, but it is evident that this does not provide the best construction for belts to be used in cone-pulley drives. The present invention provides for a construction in which the lines of the backbones of the hides will be along or parallel to this line 8 of stress in Fig. 6.

This diagonal stress in the belt, together with the natural tendency of the belt to run to the high side of the pulley causes undue stretch of the edges of the belt and a resultant "hunting" of the belt on the faces of the pulleys. The word "hunting" is used in the belt trade to denote to and fro movement of a belt on pulleys, whether straight or tapering. This "hunting" of the belt not only causes a variation of the speed of the drive, but sets up a great amount of friction between the belt and the pulleys and also causes serious injury to the edges of the belt where it rubs against the belt guides which are necessary for belt control. The unusual stresses at the edges of the belt cause the edges to curl outwards and the undue friction noted above often causes a breaking down of the inner ply of the belt with a consequent shortening of its life.

The belt of the present invention is built in the usual manner from sections cemented together, and when of two or more plies, the sections break joints, the ends of the sections being beveled to avoid spots of uneven thickness. But instead of the sections being cut so as to have the backbone line along the middle of the sections, they are cut so that the backbone line will extend parallel, or as nearly parallel as possible, to the line of stress of the belt. This means that each belt will be built for the particular machine where it is to be used in order to have the line of the backbone at the proper acute angle to the central line of the belt. In Fig. 4 the section C is cut from the hide D in such a manner as to bring the middle line 4 of the backbone to the desired angle O to the edges of the section. Fig. 5 shows the section E properly cut for a right-hand drive.

In Figs. 1, 2 and 3 are shown sections of the several plies arranged so the backbone lines 4 are at the proper angle in plies 1, 2 and 3. In Fig. 7, the line 9 of stress is parallel to the lines

4 of the backbone portions of the belt sections. Such a belt will transmit more power under a given tension, will run straighter without hunting and the edges will wear less against the belt shifter. Such a belt does not curl at the edges and the inner plies do not readily break down. Stretch of the belt is reduced to a minimum.

I claim:

1. A belt composed of sections of leather, the sections cut from the central backbone strip of the hides so that the edges of the sections will be at an acute angle to the central line of said backbone strip.

2. A belt composed of plies of sections of leather so arranged as to have the linearly strongest portions of said sections at an acute angle to the edges of the belt.

GUSTAV A. NELSON.